(12) United States Patent
Kumar

(10) Patent No.: US 11,006,590 B2
(45) Date of Patent: May 18, 2021

(54) MOISTURE MONITORING SYSTEM WITH INTERNET OF THINGS DEVICES

(71) Applicant: Lalit Kumar, San Jose, CA (US)

(72) Inventor: Lalit Kumar, San Jose, CA (US)

(*) Notice: Subject to any disclaimer, the term of this patent is extended or adjusted under 35 U.S.C. 154(b) by 0 days.

(21) Appl. No.: 16/928,581

(22) Filed: Jul. 14, 2020

(65) Prior Publication Data

US 2020/0337257 A1  Oct. 29, 2020

Related U.S. Application Data

(63) Continuation-in-part of application No. 16/047,120, filed on Jul. 27, 2018, now abandoned.

(60) Provisional application No. 62/540,836, filed on Aug. 3, 2017.

(51) Int. Cl.
*A01G 25/16* (2006.01)
*G01N 27/12* (2006.01)

(52) U.S. Cl.
CPC ......... *A01G 25/167* (2013.01); *G01N 27/121* (2013.01)

(58) Field of Classification Search
CPC ...... A01G 25/167; A01G 25/06; G01K 3/005; G01N 33/246; H04B 1/02; H04B 1/06
See application file for complete search history.

(56) References Cited

U.S. PATENT DOCUMENTS

| | | | |
|---|---|---|---|
| 6,314,340 B1 | 11/2001 | Mecham et al. | |
| 6,892,114 B1 | 5/2005 | Addink et al. | |
| 7,412,303 B1 | 8/2008 | Porter et al. | |
| 8,606,415 B1 | 12/2013 | Woytowitz et al. | |
| 8,630,743 B2 * | 1/2014 | Marsters | G05D 7/0635 700/284 |
| 9,301,461 B2 | 4/2016 | Woytowitz et al. | |
| 9,468,162 B2 | 10/2016 | Weiler et al. | |
| 10,206,341 B2 * | 2/2019 | Micu | G05B 15/02 |
| 10,285,345 B2 * | 5/2019 | Gong | A01G 25/06 |
| 10,609,878 B2 * | 4/2020 | Montgomery | A01G 25/16 |
| 2004/0206395 A1 | 10/2004 | Addink et al. | |
| 2004/0236443 A1 | 11/2004 | Ware et al. | |

(Continued)

OTHER PUBLICATIONS

Internet of Things; Minus Day; 1999 (Year: 1999).

(Continued)

*Primary Examiner* — Benjamin F Fiorello
(74) *Attorney, Agent, or Firm* — Boudwin Intellectual Property; Daniel Boudwin

(57) ABSTRACT

A moisture monitoring system with internes of things devices. The system includes at least one irrigating device having a moisture sensor, a temperature sensor, a valve connected to a water source, a wireless transmitter that sends sensor information to a cloud server via a first internet-of-things establishing a first channel of communication, and a wireless receiver configured to receive valve actuation signals from the cloud server via a second internet-of-things device establishing a second channel of communication. A valve actuator opens the valve upon receiving an actuation signal via the second internet-of-things device. The duration of the valve remaining open and other parameters are adjustable by a user utilizing a user interface of the second internet-of-things device. The moisture monitoring system can be customized and applied to various use cases depending on the irrigation needs of the user.

8 Claims, 5 Drawing Sheets

(56) References Cited

U.S. PATENT DOCUMENTS

| | | |
|---|---|---|
| 2006/0161309 A1 | 7/2006 | Moore et al. |
| 2007/0016334 A1 | 1/2007 | Smith et al. |
| 2009/0099701 A1 | 4/2009 | Li et al. |
| 2009/0216345 A1 | 8/2009 | Christfort |
| 2010/0030476 A1 | 2/2010 | Woytowitz et al. |
| 2010/0094472 A1 | 4/2010 | Woytowitz et al. |
| 2011/0093123 A1 | 4/2011 | Alexanian |
| 2016/0048135 A1 | 2/2016 | Hill |
| 2016/0143228 A1 | 5/2016 | Groot et al. |
| 2016/0163177 A1* | 6/2016 | Klicpera ............... G08B 21/18 137/59 |

OTHER PUBLICATIONS

Smart Irrigation System using IoT: SIS; Kumar et al.; Jun. 2017 (Year: 2017).
Embedded Computing Design; 2016 (Year: 2016).

* cited by examiner

MOISTURE MONITORING SYSTEM WITH INTERNET OF THINGS DEVICES

CROSS REFERENCE TO RELATED APPLICATIONS

This application is a continuation-in-part of claims the benefit of U.S. patent application Ser. No. 16/047,420 filed on Jul. 27, 2018, which claims the benefit of Provisional Patent Application No. 62/540,836 filed on Aug. 3, 2017. The above identified patent applications are herein incorporated by reference in their entirety to provide continuity of disclosure.

BACKGROUND OF THE INVENTION

The present invention relates to a moisture monitoring system. More specifically, the present invention provides a moisture monitoring system that can be utilized to remotely control the watering of plants via the wireless control of independent internet of things devices operating on independent communications channels. Many people water their plants; however, it can be difficult to determine moisture content of the soil on a daily basis. This leads to plants being watered when the moisture content is already sufficient. This can lead to overwatering, which can cause damage to the plants. Overwatering plants results in a considerable time investment for the user and wastes water. Further, water is a limited resource in certain areas, as well as during a drought, and in these situations, overwatering plants potentially causing expense to the user, or possible fines.

Some existing irrigation systems include wirelessly controllable valves that can be selectively opened to water plants. Such systems can include moisture sensors that control the timing of the valves. However, such systems are static in that they are usually incapable of being applied in other situations or use cases. For example, a wirelessly controlled irrigation system for a farm or other large area is a dedicated system that cannot be applied to other irrigation needs such as home watering for indoor plants, for example. Additionally, such systems are often only controllable via outdated communication protocols and can only operate via a single independent communications channel, thereby limiting their application and flexibility. More modern valve control systems may include "Internet of Things" (IoT) devices, which are devices that are independently connected to a network via the internet. IoT devices often have different communication channels over which they operate, for example, independent cellular networks, Wi-Fi networks, or the like. Typical wireless irrigation systems lacy this flexibility and can only operate over one channel of communication, thereby limiting their effectiveness and their ease of use for the ordinary consumer.

Therefore, a system capable of monitoring the moisture content of soil and notifying a user when it reaches a pre-set level is needed. It is desirable to provide such a system that can be utilized with IoT devices over multiple channels of communications, such that the system can be applied to a large number of use cases depending on the needs of the user.

SUMMARY OF THE INVENTION

In view of the foregoing disadvantages inherent in the known art, it is submitted that the present invention substantially diverges in design elements from the prior art and consequently it is clear that there is a need in the art for an improvement to existing moisture monitoring systems, particularly with regard to their ability to operate in many use cases with multiple communications channels and multiple IoT devices. In this regard, the present invention substantially fulfills these needs.

In one embodiment, the system includes at least one device having a moisture sensor, a temperature sensor, a valve connected to a water source, a wireless transmitter that sends sensor information to a cloud server via a first internet-of-things establishing a first channel of communication, and a wireless receiver configured to receive valve actuation signals from the cloud server via a second internes-of-things device establishing a second channel of communication. A valve actuator opens the valve upon receiving an actuation signal via the second internet-of-things device. The duration of the valve remaining open and other parameters are adjustable by a user utilizing a user interface of the second internet-of-things device. The moisture monitoring system can be customized and applied to various use cases depending on the irrigation needs of the user It is therefore an object of the present invention to provide a new and improved moisture monitoring system that has all of the advantages of the prior art and none of the disadvantages.

It is another object of the present invention to provide a moisture monitoring system that can be utilized with any number of IoT devices which establish independent communications channels with the monitoring system.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
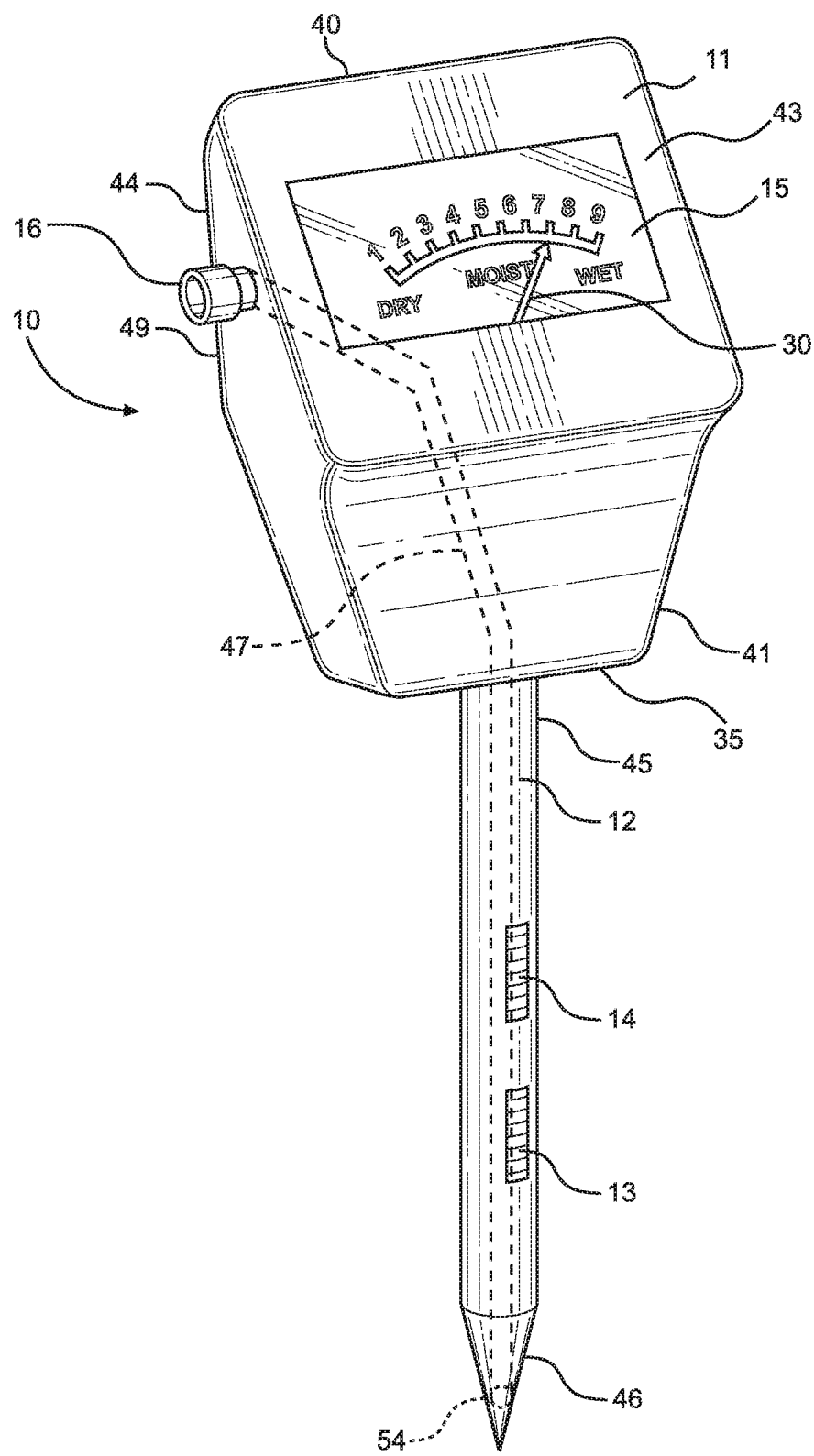
FIG. 1 shows a perspective view of an example irrigating device in an embodiment of the moisture monitoring system.

Reference is made herein to the attached drawings. Like reference numerals are used throughout the drawings to depict like or similar elements of the moisture sensor. The figures are intended for representative purposes only and should not be considered to be limiting in any respect.

As used herein, the terms "wireless transmitter", "wireless receiver", and "wirelessly transceiver" are intended to refer to any device capable of permitting wireless communication between independent devices or systems over any type of established wireless network. As used herein, "a first channel of communication" generally refers to communications made between a "first channel device" and a cloud server or other remote database or computing device, wherein the "first channel device" is capable of measuring soil characteristics and transmitting data remotely. As used herein, "a second channel of communication" generally refers to communications made between a "second channel device" and a cloud server or other remote database or computing device, wherein the "second channel device" includes one or more valves capable of wirelessly receiving opening or closing instructions from a remote source.

Figure 2:
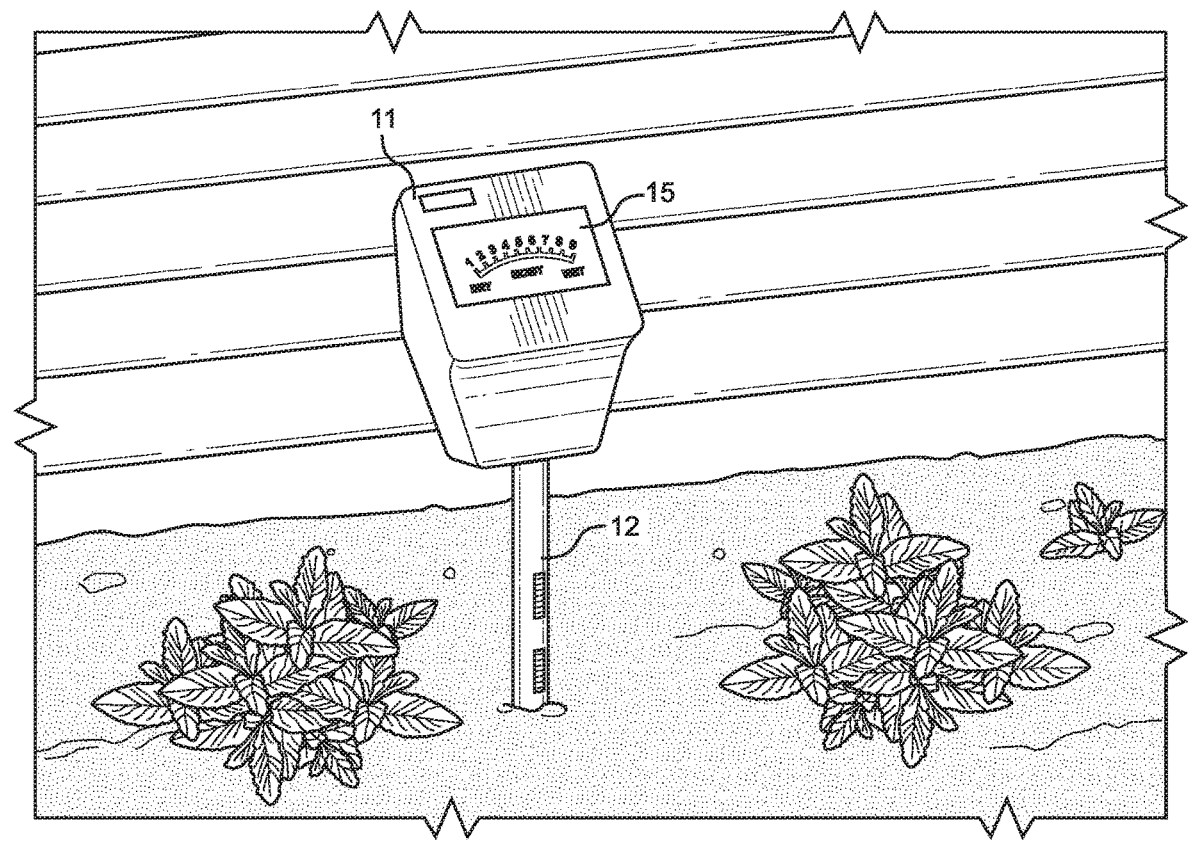
FIG. 2 shows a perspective view of an example irrigating device in an embodiment of the moisture monitoring system being inserted into soil.

Referring now to FIG. 1 and FIG. 2 there are shown a perspective views of example irrigating device in an embodiment of the moisture monitoring system. In the illustrated embodiment, the irrigating device 10 is includes a housing 11 having a stake 12 disposed at a lower end 35 thereof. The irrigating device 10 further comprises a moisture sensor 13 and temperature sensor 14 adjacent to each other and disposed on a lower, outside perimeter of the stake 12. Other embodiments of the irrigating device may include alternate arrangements of the sensors 13, 14, and may include additional sensors for determining various soil characteristics, such as pH levels, as one example.

A valve 16 is disposed on the housing 11 of the irrigation device 10. A water source can be removably secured to the valve 16. The water source may include a water line connection in a residential home or a garden hose, for example. In the illustrated embodiment, the housing 11 includes a top portion 40 and a bottom portion 41 with a front portion 43 and rear portion 44. In the illustrated embodiment, the housing 11 is composed of a hard plastic material, but any suitable materials may be utilized in the construction of the irrigation device 10. In the illustrated embodiment, the housing 11 further comprises a measuring display 15 including a moisture scale disposed on the front portion 43 of the housing 11. In the shown embodiment, the housing 11 is a rectangular shape; however, the housing 11 can be any suitable shape or outward appearance.

In the illustrated embodiment, the irrigation device 10 includes a stake 12 that includes top portion 45 and a bottom portion 46, wherein the bottom portion 46 forms a point and is adapted to engage the ground providing easier insertion therethrough. The height and width of the stake 12 can be any suitable measurement depending on the soil density. Bulk density is an indicator of soil compaction which reflects the soil's ability to function for water movement and structural support, among other things. As a result, the length of the stake 12 may require adjustment depending on the bulk density of the soil. In the illustrated embodiment, the stake 12 further comprises a channel 47 disposed therein and extending between the valve 16 and the bottom portion 46 of the stake 12, allowing liquid to flow through an aperture 54 along the bottom portion 46 and into the ground.

In the illustrated embodiment, the measuring display 15 of the example irrigation device 10 is in operable communication with the moisture sensor and communicates a level of soil moisture to a user via an embedded wireless transmitter. In some embodiments, the level is equivalent to a percentage of moisture detected by the moisture sensor. In other embodiments, the level is equivalent to pH detected by a pH sensor. In alternate embodiments, the measuring display 15 can show both the pH and percent moisture detected in the soil. In the illustrated embodiment, the level of pH and an indication of moisture level are simultaneously displayed. The display includes a pH range from 1 to 9 with 1 being acidic and 9 being basic. Further, beneath the pH reading, the moisture level displayed. The measuring display 15 may communicate an approximate soil moisture level through the words, "dry" "moist" and "wet", respectively. In one illustrated embodiment, "dry" includes a range of 0-35% soil moisture detected by the moisture sensor, "moist" includes a range of 36-74% soil moisture detected by the moisture sensor and "wet" includes a range of 75-100% soil moisture.

In the illustrated embodiment, the measuring display 15 further comprises a dial 30 configured to move to an appropriate soil moisture number based on the level of soil moisture wherein the moisture sensor is configured to communicate the moisture level to the measuring display 15. In alternate embodiments, the level of soil moisture can be any suitable number range and any suitable measuring display 15, such as digital.

In the illustrated embodiment, when the pH level communicates a value of level 5, the valve is actuated such that water is allowed to flow through the channel and into the ground. The valve also open when a temperature condition exceeds 90 degrees F. Data of air temperature and soil pH were collected over a 7-day period. Table 1 illustrates the data wherein the soil pH and air temperature were measured at 6-hour intervals throughout the 7 days. During the 7-day period, the valve opened a total of nine times—at results 4, 8, 11, 12, 15, 16, 20, 24, and 28. The pH and temperature was detected by sensors disposed on the stake. In alternate embodiments, the moisture percentage of the soil is also recorded.

TABLE 1

| Result | Date | Time | pH Level | Temperature (° F.) |
| --- | --- | --- | --- | --- |
| 1 | Day 1 | 12:00 AM | 7.2 | 60 |
| 2 | Day 1 | 6:00 AM | 6.1 | 65 |
| 3 | Day 1 | 12:00 PM | 5.1 | 75 |
| 4 | Day 1 | 6:00 PM | 4.2 | 72 |
| 5 | Day 2 | 12:00 AM | 7.2 | 59 |
| 6 | Day 2 | 6:00 AM | 6.5 | 62 |
| 7 | Day 2 | 12:00 PM | 5.5 | 82 |
| 8 | Day 2 | 6:00 PM | 4.6 | 75 |
| 9 | Day 3 | 12:00 AM | 6.1 | 65 |
| 10 | Day 3 | 6:00 AM | 5.5 | 65 |
| 11 | Day 3 | 12:00 PM | 4 | 77 |
| 12 | Day 3 | 6:00 PM | 3.5 | 87 |
| 13 | Day 4 | 12:00 AM | 5.9 | 57 |
| 14 | Day 4 | 6:00 AM | 5 | 68 |
| 15 | Day 4 | 12:00 PM | 4.6 | 78 |
| 16 | Day 4 | 6:00 PM | 4 | 88 |
| 17 | Day 5 | 12:00 AM | 7.1 | 57 |
| 18 | Day 5 | 6:00 AM | 6.6 | 62 |
| 19 | Day 5 | 12:00 PM | 5.5 | 72 |
| 20 | Day 5 | 6:00 PM | 4.5 | 82 |
| 21 | Day 6 | 12:00 AM | 6.7 | 62 |
| 22 | Day 6 | 6:00 AM | 5.9 | 70 |
| 23 | Day 6 | 12:00 PM | 5.2 | 75 |
| 24 | Day 6 | 6:00 PM | 4.7 | 84 |
| 25 | Day 7 | 12:00 AM | 5.9 | 75 |
| 26 | Day 7 | 6:00 AM | 5.4 | 62 |
| 27 | Day 7 | 12:00 PM | 4.9 | 77 |
| 28 | Day 7 | 6:00 PM | 4 | 82 |

In the shown embodiment of the irrigation device 10, the valve 16 is disposed on a side 49 portion of the housing 11 and is adapted to receive a connection to a water source. The valve is made of a hard, plastic material and the water source is any suitable water source, such as a hose or a sprinkler. In some embodiments, the valve 16 is operably connected to the moisture and temperature sensors 13, 14, such that the valve 16 is configured to automatically actuate, allowing water to flow through the stake 12 when the moisture and temperature readings reach a pre-set level. The pre-set level is dependent on the soil type and the temperature reading. In the illustrated embodiment the valve resembles a sprinkler valve is that the valve is actuated by an electrical signal received by the moister sensor when a pre-set level is detected.

Figure 3:
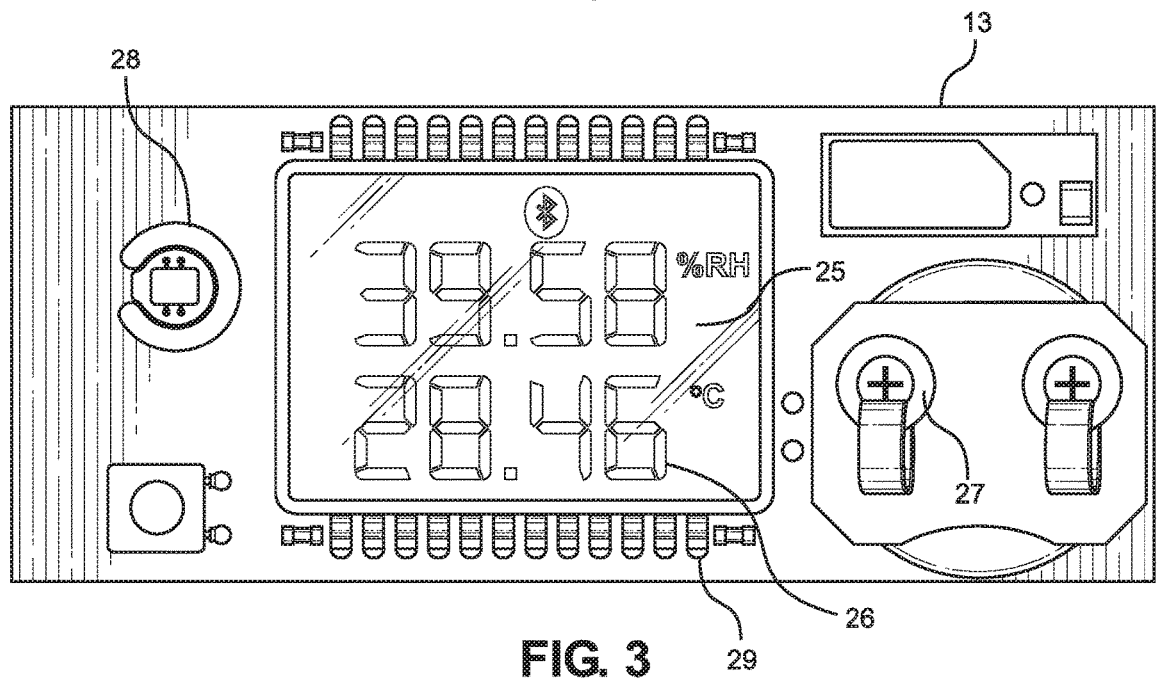
FIG. 3 shows a close-up view of example components of the example irrigating device in one embodiment of the moisture meter.

Referring now to FIG. 3, there is shown a close-up view of example components of the example irrigating device in one embodiment of the moisture meter. In the shown embodiment, the moisture sensor 13 is configured to detect moisture information regarding the amount of moisture present in soil and configured to transmit the moisture level information to the measuring display 15, wherein the measuring display 15 transmits the moisture information wirelessly via a wireless transmitter 17 located in the housing 11. In the illustrated embodiment, the moisture sensor 13 further comprises at least one insulated electrode 28 structured for insertion into the soil to a predetermined depth and a measurement circuitry 29 operably connected to the insulated electrode 28 and configured to provide a measurement of the moisture level in the soil. In the illustrated embodiment, the predetermined depth is approximately 6 inches into the soil measured from the surface of the soil. The moisture sensor 13 further includes a digital display with a first portion 25 that digitally displays the moisture level.

In some embodiments, the shown display will also be identically displayed on a second IoT device via wireless communication between the irrigation device 10 and a second IoT device. In the shown embodiment, the moisture sensor 13 comprises a power source 27, such as a battery or a solar cell to make the moisture sensor 13 operable; however, any suitable power source may be used. In addition, the temperature sensor 14 is operable to detect a temperature of the air and configured to provide an electrical signal dependent on the temperature of the soil to the measuring display 15, wherein the measuring display 15 transmits the temperature information wirelessly via the wireless transmitter 17 in the housing 11. A second portion 26 of the digital display shows the current temperature detected by the temperature sensor 14.

The irrigation device 10 described above and shown in FIGS. 1 and 2 is merely one example of an irrigation device 10 that can be utilized with the present invention. The present system is operable with any variety of irrigation device 10 that includes wirelessly communication capabilities and a controllable valve that can be selectively open to allow water flow. Additionally, the irrigation device 10 can be made up of multiple independent IoT devices operating on different channels of communication. One of the main objects of the present invention is to facilitate this operation with independent devices. For example, the irrigation device 10 can be made up of a combination of a first IoT device which has an independent wireless transceiver, sensors for determining moisture, temperature, and other soil parameters, and a second IoT device which includes its own wireless transceiver, timer, and water valve. The present system allows these two IoT devices to communicate with a cloud server via independent channels of communication. In this way, the user can utilize a single user interface, such as a cell phone application or website in communication with the cloud server, to control the independent IoT devices that collectively form the irrigation device 10.

Figure 4:
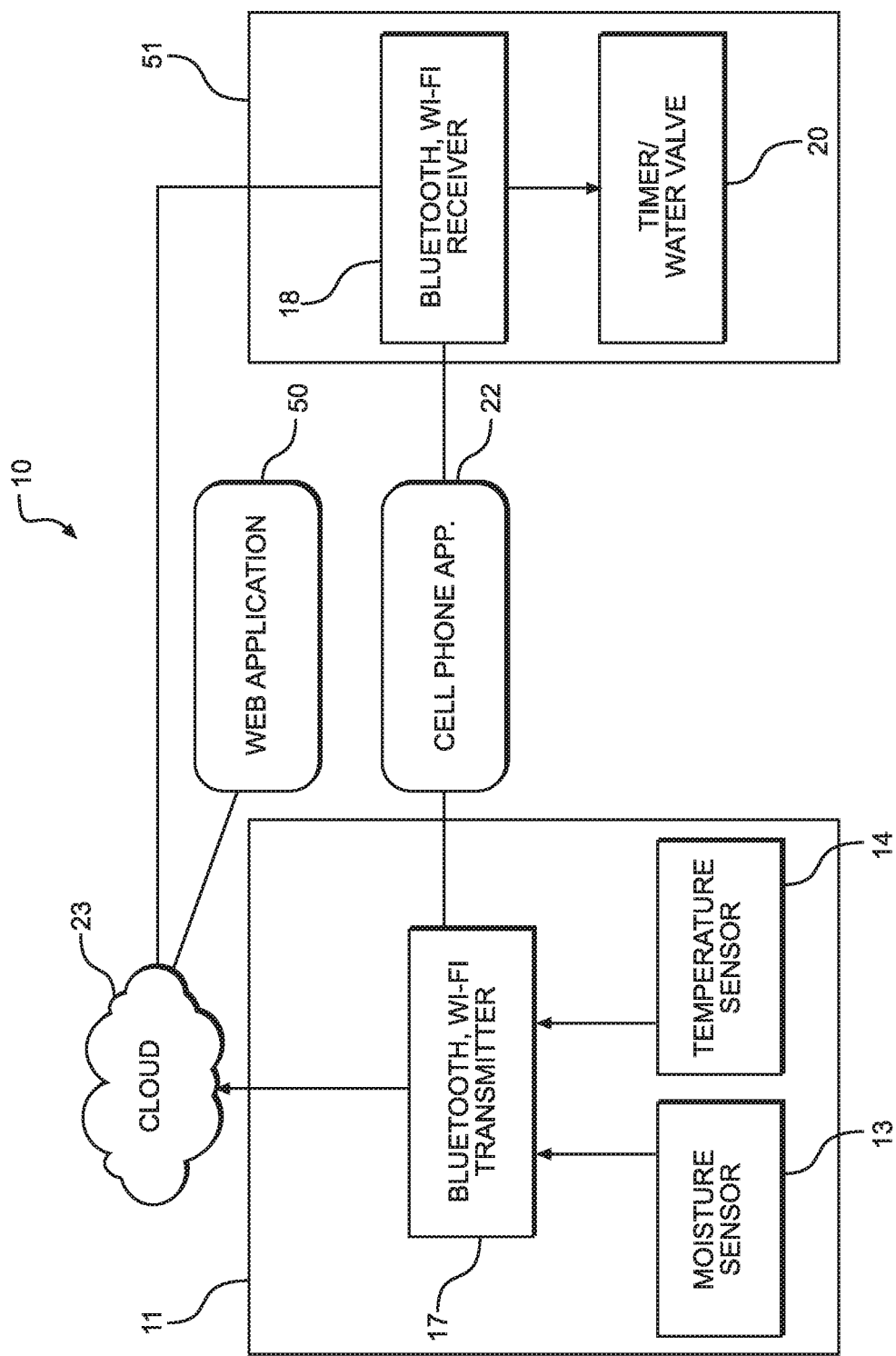
FIG. 4 shows a schematic diagram of the components of an embodiment of the moisture monitoring system.

Referring now to FIG. 4, there is shown a schematic diagram of the components of an embodiment of the moisture monitoring system. In the shown embodiment, the irrigation device 10 is made up of a first IoT device 11 that includes a wireless transceiver 17, a moisture sensor 13, and a temperature sensor 14, and a second IoT device 51 that includes a wireless transceiver 18 and a valve system 20. Each IoT device establishes independent communication channels with a cloud server 23. For example, the first IoT device may use a Wi-Fi connection, while the second IoT device might utilize Bluetooth, cellular data, or other communications methods. The system allows users to receive information from and send information to each IoT device independently via a web application 50 or a cell phone application 22.

The wireless transmitter 17 disposed within the housing 11 is configured to transmit the moisture, pH, and temperature readings from the moisture, pH, and temperature sensors 13, 14 to an external device using IoT technology. In some embodiments, the external device comprises a mobile phone, while in another embodiment, the external device comprises a web application 50 or database. The wireless transmitter 17 is further configured to wirelessly send notifications to an external device should the moisture or temperature readings reach a pre-set level. The wireless transceiver of the second IoT device is configured to receive valve actuation instructions from an external source such as a web application 50 and send it to the timer or water valve actuator. The user can utilize the web application 50 or cell phone application 22 to control the timing, duration of valve openings, moisture levels that trigger valve openings, or other parameters of the system.

In the illustrated embodiment, the wireless receiver 18, the timer and water valve 20 are disposed within an independent IoT device 51. The pre-set time can be any suitable time selected by the user. The external web application 50 is programmable by the user, wherein the user selects the pre-set moisture levels and temperature readings for actuation of the valve 20. In operation, the moisture and temperature sensors 13, 14 collect information that is wirelessly transmitted 17 to the cloud server 23 for access via the web application 50. If the web application 50 determines that the moisture level and temperature readings are at the pre-set output, a control signal is sent to the wireless receiver in the second IoT device via a second communication channel to actuate the valve 20 for a pre-determined period of time.

In some embodiments of the system, moisture and temperature data detected from the sensors are sent via the first IoT device transmitter 17 to the cloud server 23 server a predetermined number of times per day. In the illustrated embodiment, the data is collected and transmitted 4 times per day at 6-hour intervals, as shown in Table 1. Dependent upon whether the measurements exceed the threshold value of predetermined levels, the server send a signal to the water valve 20 via a second channel of communication, via a TCP/IP connection for example, in order to automatically open the valve and release water therethrough. The duration of the valve remaining open and at what times the measurements are transmitted to the cloud server 23 are set on a user interface such as a web application 50 or cell phone application 22. In some embodiments, the valve timing can be manually set on a timer disposed on the water valve controls on the second IoT device. Further, the user is able to select the predetermined levels upon which the valve will open through the web application. For example, if a user desires to conserve water, the user will select a lower pH level i.e. 4 or moisture level i.e. "dry." In the illustrated embodiment, the sensors do not need to be calibrated on the IoT device itself, because a user is able to manually calibrate the parameters of the system through the web application 50 or cell phone application 22.

Figure 5:
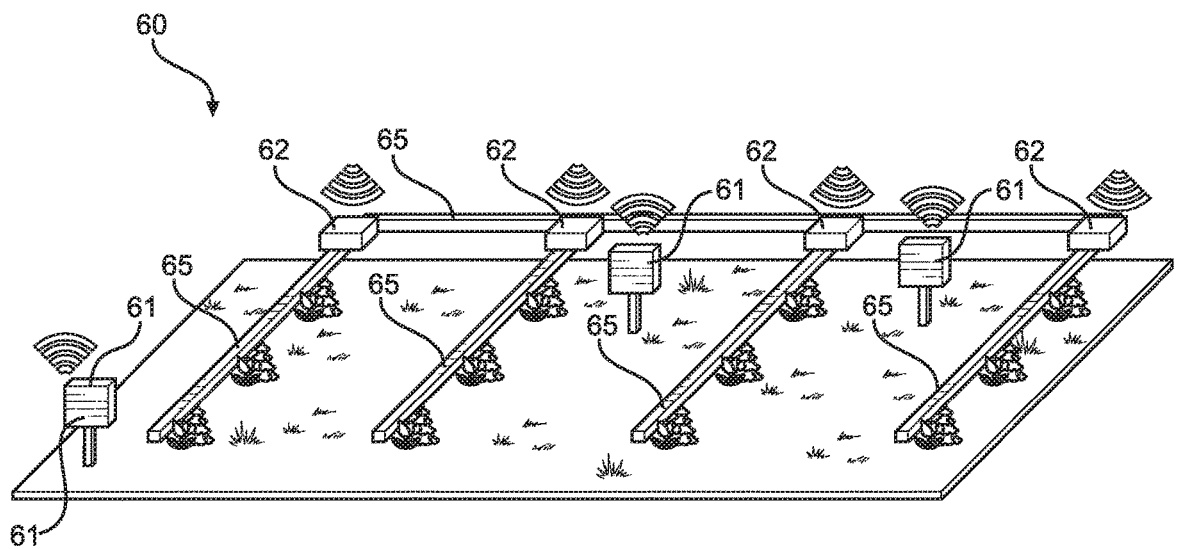
FIG. 5 shows a perspective view of a first use case example of an embodiment of the moisture monitoring system.

Referring now to FIG. 5, there is shown a perspective view of a first use case example of an embodiment of the moisture monitoring system. In the illustrated embodiment, the system is applied to a larger scale outdoor irrigation system. The irrigation devices include a group of first IoT devices 61 which measures moisture, temperature, and other soil parameters, and a group of second IoT devices 62 which include controllable water valves that can be opened to distribute water to plants via water lines 65. The first IoT devices 61 and second IoT devices 62 can communicate with the cloud server via independent communication channels. In order to scale the system to a desired size, the user can simply add or remove additional IoT devices to accurately cover the amount of land that includes plants.

Figure 6:
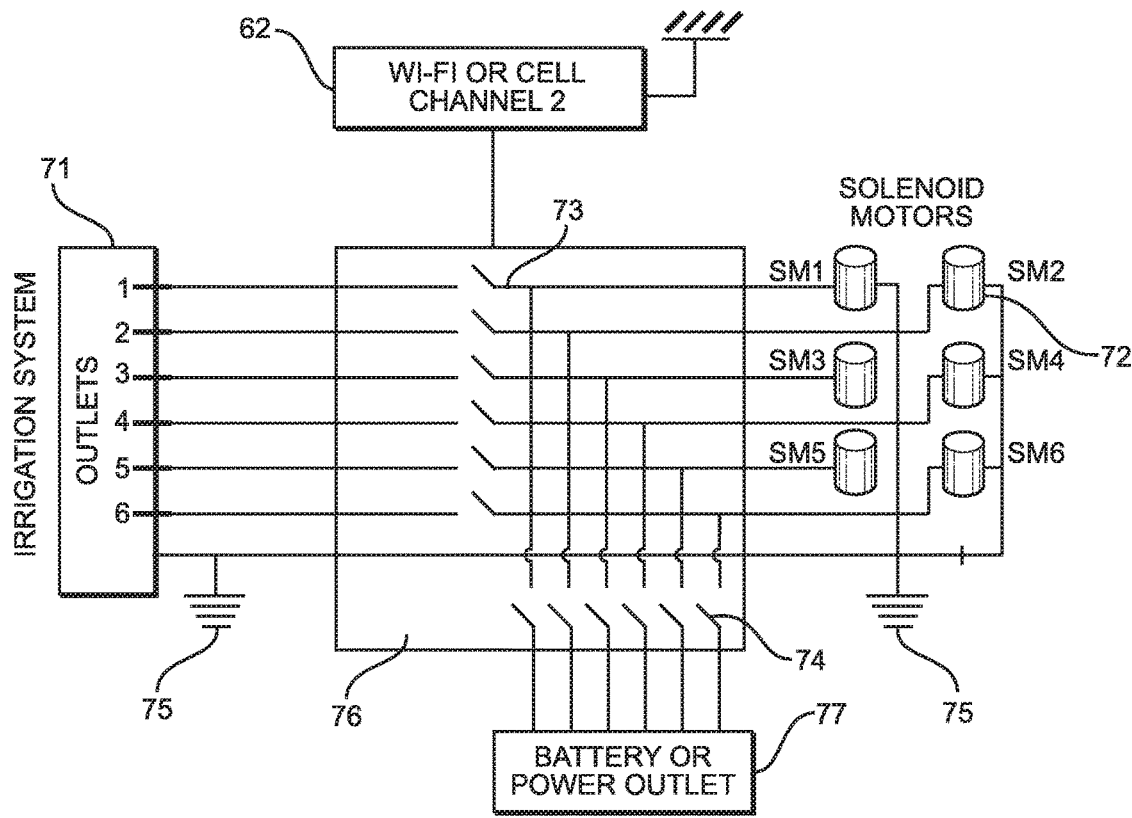
FIG. 6 shows a schematic diagram of a second use case example of an embodiment of the moisture monitoring system.

Referring now to FIG. 6, there is shown a schematic diagram of a second use case example of an embodiment of the moisture monitoring system. In the illustrated embodiment, an existing irrigation system 71 includes multiple outlets to different areas for irrigation. The valves are controlled via independent solenoid motors 72. The system can communicate wirelessly to turn the irrigation devices on or off using electric relays 73, 74 and power control or battery 77. Electric relays 73 will connect or disconnect the irrigation system 71 with the solenoid motors 72 and let the irrigation system 71 actuate the solenoid motors 72. Electric relays 74 will actuate the solenoid motors 72 instantly and will be remotely controlled wirelessly by a communication with a second IoT device over a second channel of communication 62. Since the system allows communication via multiple independent channels, the system can be installed between existing irrigation control panels 71 to provide enhanced control capabilities over the solenoid motors 72, thereby upgrading the existing system.

Figure 7:
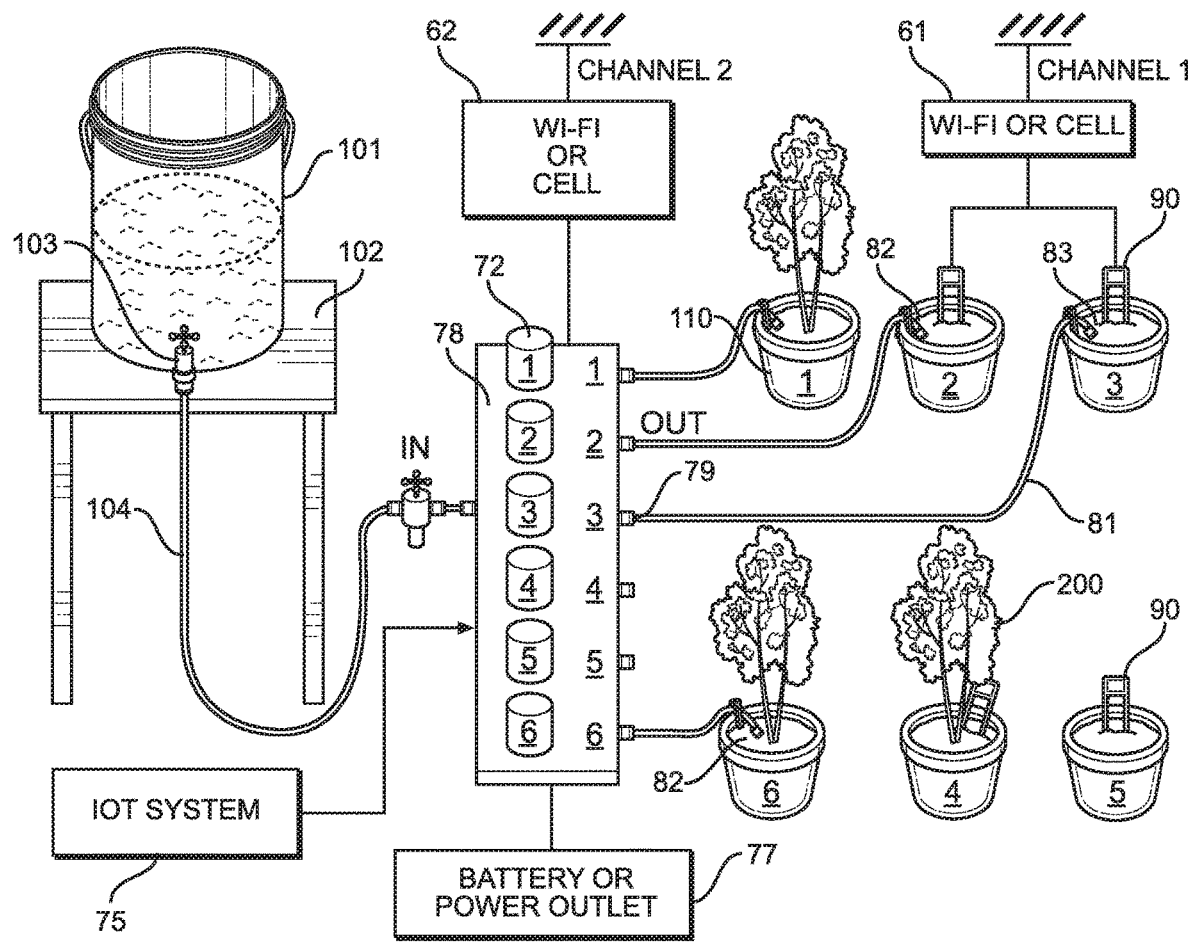
FIG. 7 shows a perspective view of a third use case example of an embodiment of the moisture monitoring system.

Referring now to FIG. 7, there is shown a perspective view of a third use case example of an embodiment of the moisture monitoring system. In the shown embodiment, the system is utilized in a smaller indoor setting to control the watering of separately potted individual plants. In this embodiment, the water supply includes a water reservoir 101 having a manual release valve 103. The reservoir 101 is supported in an elevated position via a table 102 or other support, such that the water can flow to an irrigation device 78 through a connecting tube 104 via the force of gravity.

The irrigation device 78 includes multiple independently actuatable solenoid motors 72 that make up the second IoT device 78. The solenoid motors operate valves that selectively permit water to flow out of an outlet 79, through a water line 81, and into a designated plant pot 110. Moisture, temperature, or other types of sensors that make up the first IoT devices 90 are inserted into individual pots. The first IoT devices 90 each include various sensors for determining soil characteristics such as moisture, temperature, pH levels, and the like. Each individual first IoT device 90 can communicate wirelessly with the system 75 via their own independent channels of communication 61 that differ from the second IoT device 78 channels. For example, the system can independently control individual solenoid valves 72 dependent on different types of plants 200 or different soil types 82, 83.

As illustrated and discussed above, the sensor devices that make up the group of first IoT devices can communicate via a first channel, such as a cellular connection to a cell phone application, for example, while the second IoT devices can communicate with the system via a second channel of communication, such as a Wi-Fi connection to a web based application, for example. In this way, the system can be customized to various use cases and operated with multiple types of IoT devices, all of which can independently communicate with and be controlled by the overall moisture monitoring system.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A moisture monitoring system, comprising:
   a first housing having at least one stake disposed at a lower end thereof;
   a moisture sensor configured to detect moisture in soil;
   a temperature sensor configured to detect a temperature of the soil;
   a valve operably connected to a valve actuator, wherein the valve is in fluid communication with a water source, wherein the water source is removably secured to the valve;
   a first wireless transceiver disposed within the housing configured to send temperature and moisture information detected by the moisture sensor and the temperature sensor to a cloud server such that the housing acts as a first internet-of-things device, the wireless transmitter establishing a first channel of communication between the first internet-of-things device and a cloud server;
   a second wireless transceiver disposed in a second internet-of-things device configured to receive valve actuation signals from the cloud server, wherein the valve actuator is configured to selectively open the valve upon receiving the valve actuation signals to allow water to flow through the valve;
   wherein a duration of the valve remaining open is configured to be defined by a user utilizing one of a web application, a cell phone application, or a user interface of the second internet-of-things device;
   wherein the second transceiver establishes a second channel of communication with the second internet-of-things device.

2. The moisture monitoring system of claim 1, wherein the first housing includes a channel disposed between the valve and a tip of the stake, allowing liquid to flow therethrough.

3. The moisture monitoring system of claim 1, wherein the first internet-of-things device is configured send a notification through its wireless transceiver to the cloud server when the moisture and temperature sensors each detect a pre-set moisture level and temperature level.

4. The moisture monitoring system of claim 1, wherein the valve of the second internet-of-things device is operably connected to the temperature and moisture sensors, such that the valve is configured to automatically actuate, allowing water to flow through the stake, when the moisture and temperature readings reach a pre-set level.

5. The moisture monitoring system of claim 1, wherein the first housing comprises at least one insulated electrode configured to insert into the soil to a predetermined depth.

6. The moisture monitoring system of claim 1, wherein the first internes-of-things device further comprises a measuring display configured to receive moisture information from the moisture sensor and transmit the moisture information wirelessly via its wireless transceiver.

7. The moisture monitoring system of claim 6, wherein the measuring display comprising a range of digits configured to indicate moisture level detected from the moisture sensor and a plurality of descriptive words to indicate corresponding moisture level detected by the moisture sensor.

8. The moisture monitoring system of claim 1, wherein the second internet of things device comprises one or more solenoid motors that are operably connected to the wireless transceiver.

* * * * *